US011010204B1

(12) United States Patent
Gorsica et al.

(10) Patent No.: US 11,010,204 B1
(45) Date of Patent: May 18, 2021

(54) SPLITTING INPUT/OUTPUT FUNCTIONS BETWEEN MULTIPLE COMMUNICATION DEVICES

(71) Applicant: MOTOROLA MOBILITY LLC, Chicago, IL (US)

(72) Inventors: John J. Gorsica, Round Lake, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/690,084

(22) Filed: Nov. 20, 2019

(51) Int. Cl.
*G06F 9/50* (2006.01)
*G06F 9/48* (2006.01)

(52) U.S. Cl.
CPC .......... *G06F 9/5072* (2013.01); *G06F 9/4843* (2013.01); *G06F 9/5011* (2013.01); *G06F 9/5027* (2013.01)

(58) Field of Classification Search
CPC ............. H04L 67/1014; H04L 67/1078; G06F 9/5072; G06F 9/5011; G06F 9/5027; G06F 9/4843
See application file for complete search history.

(56) References Cited

U.S. PATENT DOCUMENTS

2017/0013035 A1* 1/2017 Baldwin ................ H04L 45/24

* cited by examiner

*Primary Examiner* — El Hadji M Sall
(74) *Attorney, Agent, or Firm* — Isidore PLLC

(57) ABSTRACT

A method, a data processing system (DPS) and a computer program product for splitting input/output (I/O) functions between several network-connected communication devices and the DPS. The method includes receiving, via a processor of a computing system, a first request for a first session from a first communication device, initiating the first session and receiving a second request for shared access to the first session from a second communication device. The method further includes initiating concurrent access to the first session for the second communication device and generating shared output data for the first session. The method further includes splitting the shared output data into first partial output data for the first communication device and second partial output data for the second communication device. The method further includes transmitting the first partial output data to the first communication device and transmitting the second partial output data to the second communication device.

20 Claims, 11 Drawing Sheets

US 11,010,204 B1

SPLITTING INPUT/OUTPUT FUNCTIONS BETWEEN MULTIPLE COMMUNICATION DEVICES

BACKGROUND

1. Technical Field

The present disclosure generally relates to communication devices and in particular to splitting input/output functions between multiple communication devices.

2. Description of the Related Art

Mobile communication devices, such as cell phones, are widely used for voice communication and data transmission. Users of these devices typically have several other user devices that are utilized by or associated with that user. For example, the user may have a wearable device, an in-office, in-vehicle, or in-home smart device, equipped with a virtual assistant, etc. Mobile communication devices communicate with other network systems such as cellular base stations and communication network systems. A communication device user may prefer to use more than one communication device to send information and receive content from other network systems.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
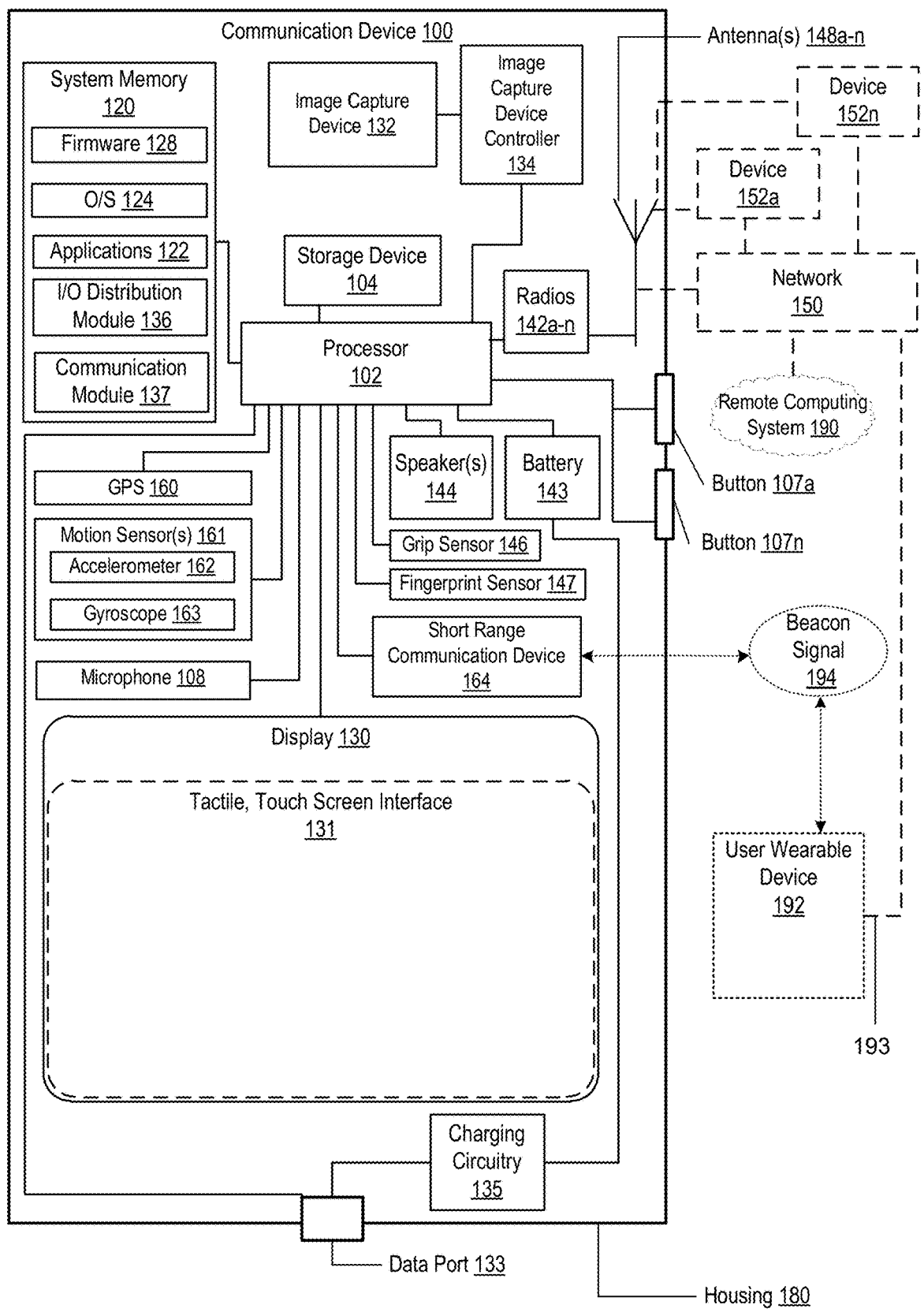
FIG. 1A depicts an example communication device configured as a mobile device and within which various aspects of the disclosure can be implemented, according to one or more embodiments.

According to a first aspect of the disclosure, the illustrative embodiments provide a method, a data processing system (DPS), a computer program product, and a communication device for splitting I/O functions between several network-connected communication devices and the DPS. According to a first embodiment, the method includes receiving, via a processor of a computing system, a first request for a first session from a first communication device. The first communication device is remote from the computing system and in communication with the computing system via a communication network. The method further includes initiating the first session for the first communication device and receiving a second request for shared access to the first session from a second communication device. The second communication device is also remote from the computing system and in communication with the computing system via the communication network. The method further includes initiating concurrent access to the first session for the second communication device and generating shared output data for the first session. The method also includes splitting the shared output data into first partial output data for the first communication device and second partial output data for the second communication device. The first partial output data is associated with at least one first input/output (I/O) function of the first communication device and the second partial output data is associated with at least one second I/O function of the second communication device. The method further includes transmitting the first partial output data to the first communication device and transmitting the second partial output data to the second communication device.

According to another embodiment, a DPS comprises a memory having stored thereon an input/output (I/O) distribution module for splitting I/O functions between several network-connected communication devices and the DPS. The network-connected communication devices are remote from the DPS and in communication with the DPS. One or more processors are communicatively coupled to the memory. The one or more processors execute program code of the I/O distribution module, which enables the DPS to receive a first request for a first session from a first communication device and to initiate the first session for the first communication device. The program code further enables the DPS to receive a second request for shared access to the first session from a second communication device and to initiate concurrent access to the first session for the second communication device. The program code further enables the DPS to generate shared output data for the first session and to split the shared output data into first partial output data for the first communication device and second partial output data for the second communication device. The first partial output data is associated with at least one first input/output (I/O) function of the first communication device and the second partial output data is associated with at least one second I/O function of the second communication device. The program code further enables the DPS to transmit the first partial output data to the first communication device and to transmit the second partial output data to the second communication device.

According to an additional embodiment, a computer program product includes a computer readable storage device with program code stored thereon which, when executed by one or more processors of a DPS, enables the DPS to receive, from a first communication device, a first request for a first session. The first communication device is remote from the DPS and in communication with the DPS via a communication network. The computer program product further enables the DPS to initiate the first session for the first communication device and to receive, from a second communication device, a second request for shared access to the first session. The second communication device is remote from the DPS and in communication with the DPS via the communication network. The computer program product further enables the DPS to initiate concurrent access to the first session for the second communication device and to generate shared output data for the first session. The computer program product further enables the DPS to split the shared output data into first partial output data for the first communication device and second partial output data for the second communication device. The first partial output data is associated with at least one first input/output (I/O) function of the first communication device and the second partial output data is associated with at least one second I/O function of the second communication device. The computer program product further enables the DPS to transmit the first partial output data to the first communication device and to transmit the second partial output data to the second communication device.

According to a further embodiment, a method is provided for splitting I/O functions between a computing system and several network-connected communication devices. The method includes transmitting, via a processor of a first communication device, a request for a first session to a computing system. The first communication device is remote from the computing system and in communication with the computing system via a communication network. The method further includes receiving access to the first session via the first communication device and transmitting first partial input data to the computing system. The first partial input data is a portion of shared input data for the computing system. The first partial input data is associated with at least one first input/output (I/O) function of the first communication device. The method further includes receiving first partial output data from the computing system. The first partial output data is a portion of shared output data for the computing system. The first partial output data is associated with the at least one first I/O function of the first communication device. The method further includes configuring the first communication device to support the at least one first I/O function.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example communication device 100 configured as a mobile device and within which various aspects of the disclosure can be implemented, according to one or more embodiments. Examples of such communication devices include, but are not limited to, a notebook computer, a mobile phone, a digital camera, and a tablet computer, etc. Communication device 100 includes processor 102, which is communicatively coupled to storage device 104, system memory 120, display 130, and image capture device controller 134.

System memory 120 may be a combination of volatile and non-volatile memory, such as random access memory (RAM) and read-only memory (ROM). System memory 120 can store program code or similar data associated with firmware 128, an operating system 124, applications 122, input/output (I/O) distribution module 136 and communication module 137. I/O distribution module 136 includes program code that is executed by processor 102 to enable splitting I/O functions between several network-connected communication devices, at least one of which includes communication device 100 and a remote computing system or data processing system. Communication module 137 includes program code that is executed by processor 102 to enable communication device 100 to communicate with other devices and system. Although depicted as being separate from applications 122, I/O distribution module 136 and communication module 137 may also be each implemented as an application. Processor 102 loads and executes program code stored in system memory 120. Examples of program code that may be loaded and executed by processor 102 include program code associated with applications 122 and program code associated with I/O distribution module 136 and communication module 137.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or control communication device 100 by touching features presented within (i.e., below the surface of) the display screen.

In one embodiment, image capture device 132 is communicatively coupled to image capture device controller 134, which is communicatively coupled to processor 102. Image capture device 132 can capture images that are within the field of view of image capture device 132. In an embodiment, image capture device 132 can capture biometric data in facial images of users and non-users in proximity to communication device 100.

Communication device 100 can further include data port 133, charging circuitry 135, and battery 143. Communication device 100 further includes a microphone 108, one or more speakers 144 and one or more input buttons 107*a-n*. Input buttons 107*a-n* may provide controls for volume, power, and image capture device 132.

Communication device 100 further includes radios 142*a-n*, which are coupled to antennas 148*a-n*. In this implementation, radios 142*a-n* and antennas 148*a-n* allow communication device 100 to communicate wirelessly with other devices 152*a-n* via wireless network 150. In one embodiment, a remote computing system 190 can communicate with communication device 100 via wireless network 150. According to one embodiment, various software modules can be stored within and be executed by remote computing system 190 to enable or support various functions of communication device 100. In one embodiment, remote computing system 190 can be a cloud based computing system or environment.

Communication device 100 further includes grip sensor 146, fingerprint sensor 147, global positioning system (GPS) device 160 and motion sensor 161. Grip sensor 146 is a pressure or tactile sensor arranged on the peripheral edge of the housing of communication device 100. Grip sensors 146 measure the force applied by a user's hand and can provide biometric data to identity a user of communication device 100. Fingerprint sensor 147 can scan the finger of a user and generate biometric data or fingerprint data corresponding to the user's fingerprint. A user places his/her finger over the fingerprint sensor in order to initiate scanning of the fingerprint. Fingerprint sensor 147 can be used to provide biometric data to identify a user. GPS device 160 can provide time data and location data about the physical location of communication device 100 using geospatial input received from GPS satellites.

Motion sensor(s) 161 can include one or more accelerometers 162 and gyroscope 163. Motion sensor(s) 161 can detect movement of communication device 100 and provide motion data to processor 102 that indicate the spatial orientation and movement of communication device 100. Accelerometers 162 measure linear acceleration of movement of communication device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of communication device 100.

Communication device 100 further includes short range communication device 164. Short range communication device 164 is a low powered transceiver that wirelessly communicates with other devices such as user wearable device 192. Short range communication device 164 can include one or more of a variety of devices, such as a near field communication (NFC) device, a Bluetooth device, or a wireless fidelity (Wi-Fi) device. User wearable device 192 can include one or more of a variety of devices such as a smart-watch, key-fob, fitness tracker, or smart-glasses.

In one embodiment, user wearable device 192 can transmit a beacon signal 194 to short range communication device 164. Communication device 100 can use beacon signal 194 to calculate the proximity or distance between a person wearing user wearable device 192 and communication device 100 using various techniques. In one embodiment, communication device 100 can use time of flight (TOF) to calculate the distance between user wearable device 192 and communication device 100. TOF is the amount of time a signal takes to propagate from a transmitter to a receiver. Because the signal propagation rate is constant, the travel time of a signal can be used to directly calculate distance. In another embodiment, communication device 100 can use received signal strength indication (RSSI) to calculate the distance. RSSI is a measurement of the power level received by a receiver. The distance between user wearable device 192 and communication device 100 can be calculated based on the relationship between the transmitted and received signal strength and the amount of time the signal takes to propagate from a transmitter to a receiver. Communication device 100 further includes a housing 180 that contains the components of the communication device.

Figure 1B:
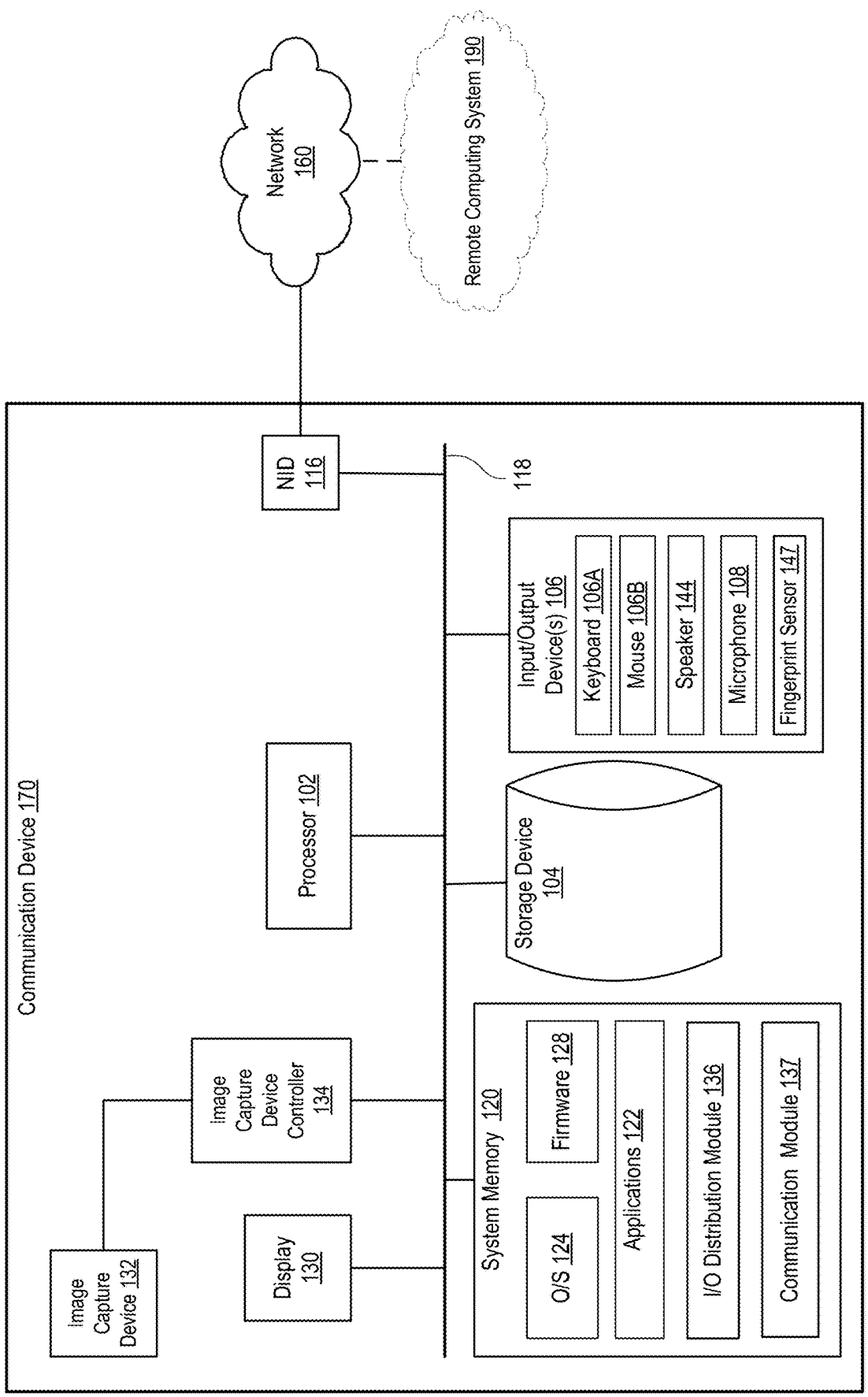
FIG. 1B depicts an example communication device configured as a computing device and within which various aspects of the disclosure can be implemented, according to one or more embodiments.

FIG. 1B depicts an example communication device configured to be a computing device, according to one or more embodiments. Communication device 170 can be any computing device that is configured to and which supports communication with remote computing system 190. Examples of such communication devices include, but are not limited to, a desktop computer, a television, a monitor, a smart-speaker, a notebook computer, etc. Communication device 170 includes a processor 102, storage device 104, system memory 120 and display 130. System bus 118 communicatively couples one or more of the processor 102, storage device 104, system memory 120 and display 130 with each other. Additionally, communication device 170 includes one or more input/output devices 106, network interface device (NID) 116, image capture device 132, and image capture device controller 134. System bus 118 communicatively couples one or more of the input/output device 106, NID 116, image capture device 132, and image capture device controller 134 to one or more components, such as processor 102 and system memory 120. Input/output devices 106 can be various devices such as keyboard 106A, mouse 106B, speaker 106C, microphone 106D, fingerprint sensor 147, et al.

System memory 120 may be a combination of volatile and non-volatile memory, such as random access memory (RAM) and read-only memory (ROM). System memory 120 can store program code or similar data associated with firmware 128, an operating system 124, applications 122, I/O distribution module 136, and communication module 137. I/O distribution module 136 includes program code that is executed by processor 102 to enable splitting I/O functions between several network-connected communication devices and remote computing system 190.

Communication module 137 includes program code that is executed by processor 102 to enable communication device 170 to communicate with other devices and system. Although depicted as being separate from applications 122, I/O distribution module 136 and communication module 137 may also be each implemented as an application. Processor 102 loads and executes program code stored in system memory 120. Examples of program code that may be loaded and executed by processor 102 include program code associated with applications 122 and program code associated with I/O distribution module 136 and communication module 137.

Communication device 170 can be in communication, via NID 116, with one or more networks, generally represented as network 160. Network 160 can be a variety of networks such as a local area network, a wide area network, a wireless network or the internet. Communication device 170 can be in communication with remote computing system 190 via network 160.

Figure 2:
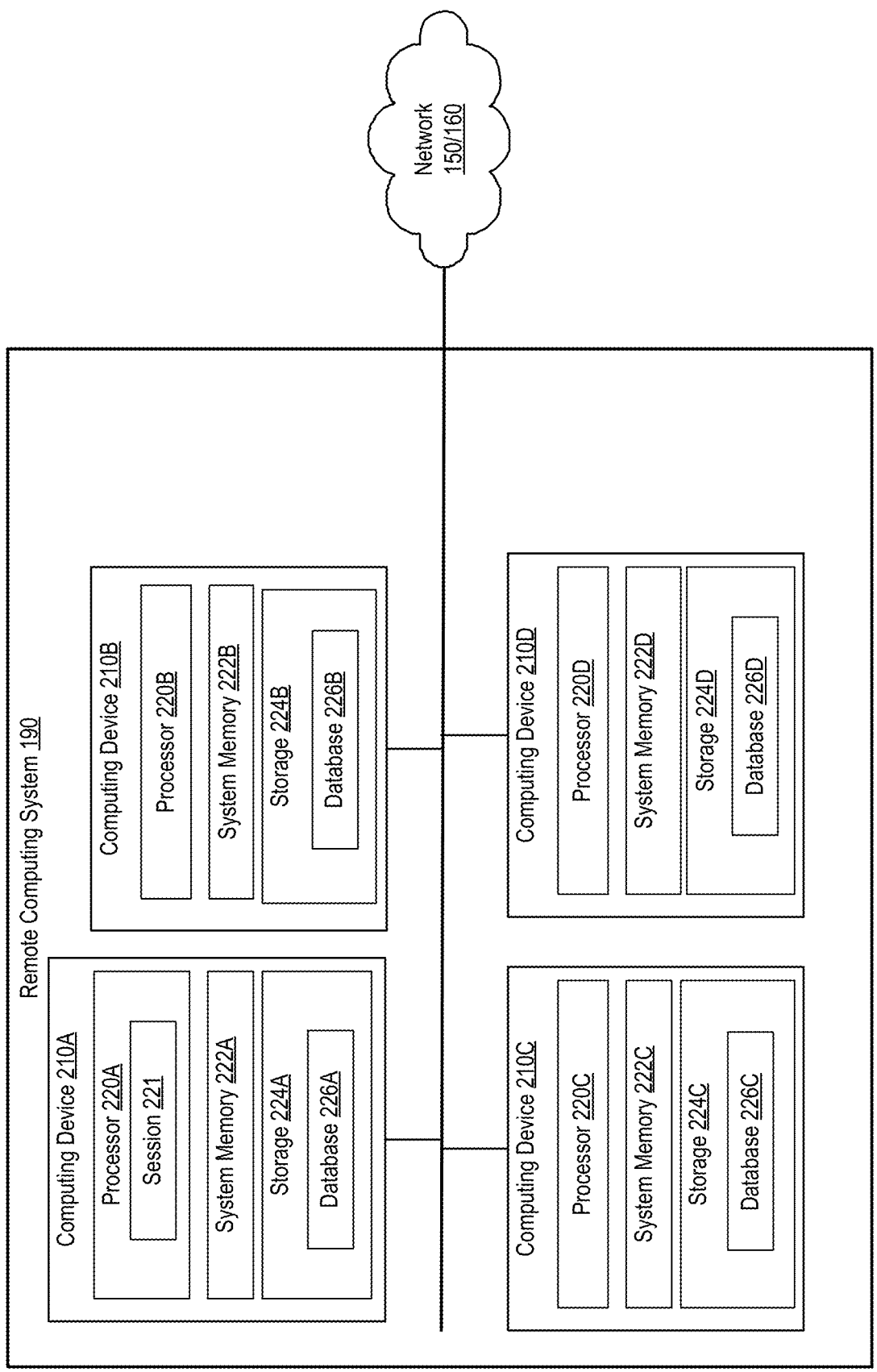
FIG. 2 depicts an example remote computing system within which various aspects of the disclosure can be implemented, according to one or more embodiments.

In the description of each of the following figures, reference is also made to specific components illustrated within the preceding figure(s). With reference now to FIG. 2, details of a data processing system (DPS) or remote computing system 190 are shown. In one embodiment, DPS or remote computing system 190 can be a cloud-based computing system or environment. DPS or remote computing system 190 includes several computing devices 210A, 210B, 210C and 210D (collectively 210A-D). Computing devices 210A-D can include various computing devices such as computers, servers, nodes and blades.

Computing devices 210A-D include respective processors 220A-D, respective system memory 222A-D and respective storage devices 224A-D. A system bus (not shown) communicatively couples one or more of the processor, system memory and storage device with each other within respective computing devices 210A-D. System memory 222A-D may be a combination of volatile and non-volatile memory, such as random access memory (RAM) and read-only memory (ROM). System memory 222A-D can store program code or similar data associated with an operating system, applications and software modules. Processors 220A-D load and execute program code stored in system memory 222A-D. Session 221 is shown running on processor 220A. In one embodiment, session 221 represents a computing session between communication device 100 or 170 and remote computing system 190. Storage devices 224A-D includes respective databases 226A-D. In one embodiment, databases 226A-D can be located on other networked databases that are remote from computing devices 210A-D. Databases 226A-D can store various information and data, such as data received from one or more communication devices 100 and/or 170. In one embodiment, computing devices 210A-D may not be physically separated computing devices, but can be implemented as virtualized computing machines on a cloud server or cloud computing system.

One or more networks, generally represented as networks 150/160, can be in communication with remote computing system 190. Network 150/160 can be or include one or more of a variety of networks such as a local area network, a wide area network, a wireless network, or the Internet. Communication devices 100 and/or 170 can be in communication with remote computing system 190 via networks 150 and/or 160.

Figure 3A:
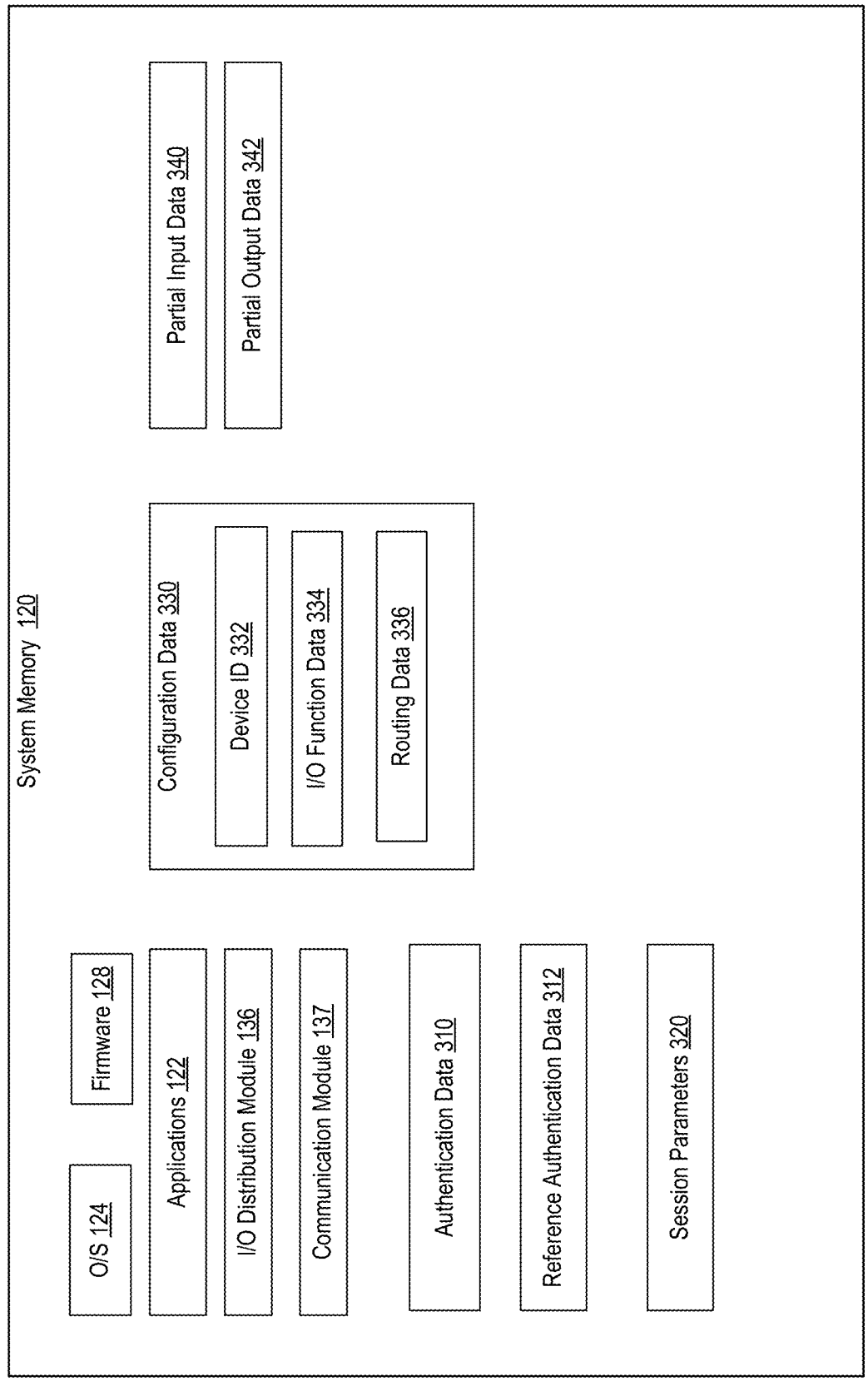
FIG. 3A is a block diagram of example contents of the system memory of a communication device, according to one or more embodiments.

Referring to FIG. 3A, one embodiment of example contents of system memory 120 of communication device 100/170 is shown. System memory 120 includes data, software, and/or firmware modules, including firmware 128, operating system 124, applications 122, I/O distribution module 136, and communication module 137. In one embodiment, I/O distribution module 136 enables splitting I/O functions between several network-connected communication devices and remote computing system 190. In one embodiment, execution of I/O distribution module 136 by processor 102 enables/configures communication device 100 or 170 to perform the processes presented in the flowcharts of FIGS. 5 and 6 as will be described below. Communication module 137 enables communication device 100 or 170 to communicate with network 150 or 160 and remote computing system 190.

System memory 120 further includes authentication data 310, reference authentication data 312, and session parameters 320. Authentication data 310 is data used to describe, identify, and authenticate individuals using communication device 100 or 170. Authentication data 310 can be received from one or more components (e.g., touch screen interface 131, image capture device 132, and microphone 108) of communication device 100/170. In one embodiment for example, authentication data 310 can be a facial image captured by image capture device 132. In another embodiment, authentication data 310 can be a passcode entered by a user via touch screen interface 131 during a log-in process. In another embodiment, authentication data 310 can be a voice recorded via microphone 108.

Reference authentication data 312 is previously stored valid or authenticated data of registered users associated with communication device 100 or 170. Reference authentication data 320 can include valid facial images of the face of registered users associated with communication devices 100 or 170, stored valid fingerprints of registered users associated with communication devices 100 or 170, stored valid voices of registered users associated with communication device 100 or 170, and stored valid passcodes of registered users associated with communication device 100 or 170. Session parameters 320 represent information associated with a computing session between communication device 100 or 170 and remote computing system 190.

System memory 120 further includes configuration data 330, partial input data 340, and partial output data 342. Configuration data 330 includes device identifier (ID) 332, I/O function data 334, and routing data 336. Device ID 332 is the name or identity of communication device 100 or 170. I/O function data 334 is information and data describing I/O functions and capabilities of one or more components of communication device 100 or 170. In one embodiment, a user can configure or select I/O function data 334 according to a desired operation by the user. For example, I/O function data 334 can be input by a user selecting an icon on touch screen interface 131 to configure display 130 as an on-screen keyboard to receive typing input. Alternatively, I/O function data 334 can be input by a user via a voice command received by microphone 108 to configure display 130 as an on-screen keyboard to receive typing input. Routing data 336 contains information for the transmission of partial input data 340 and partial output data 342 via communications network 150 or 160. Configuration data 330 is transmitted from communication device 100 or 170 to remote computing system 190.

Partial input data 340 is data received from one or more components of communication device 100 for session 320 that are transmitted to remote computing system 190. Partial input data 340 makes up a portion or fraction of the total (or combined) input data for the session at remote computing system 190. Partial output data 342 is data received from remote computing system 190 for session 320. Partial output data 342 makes up a portion or fraction of the total (or combined) output data for the session at remote computing system 190.

Figure 3B:
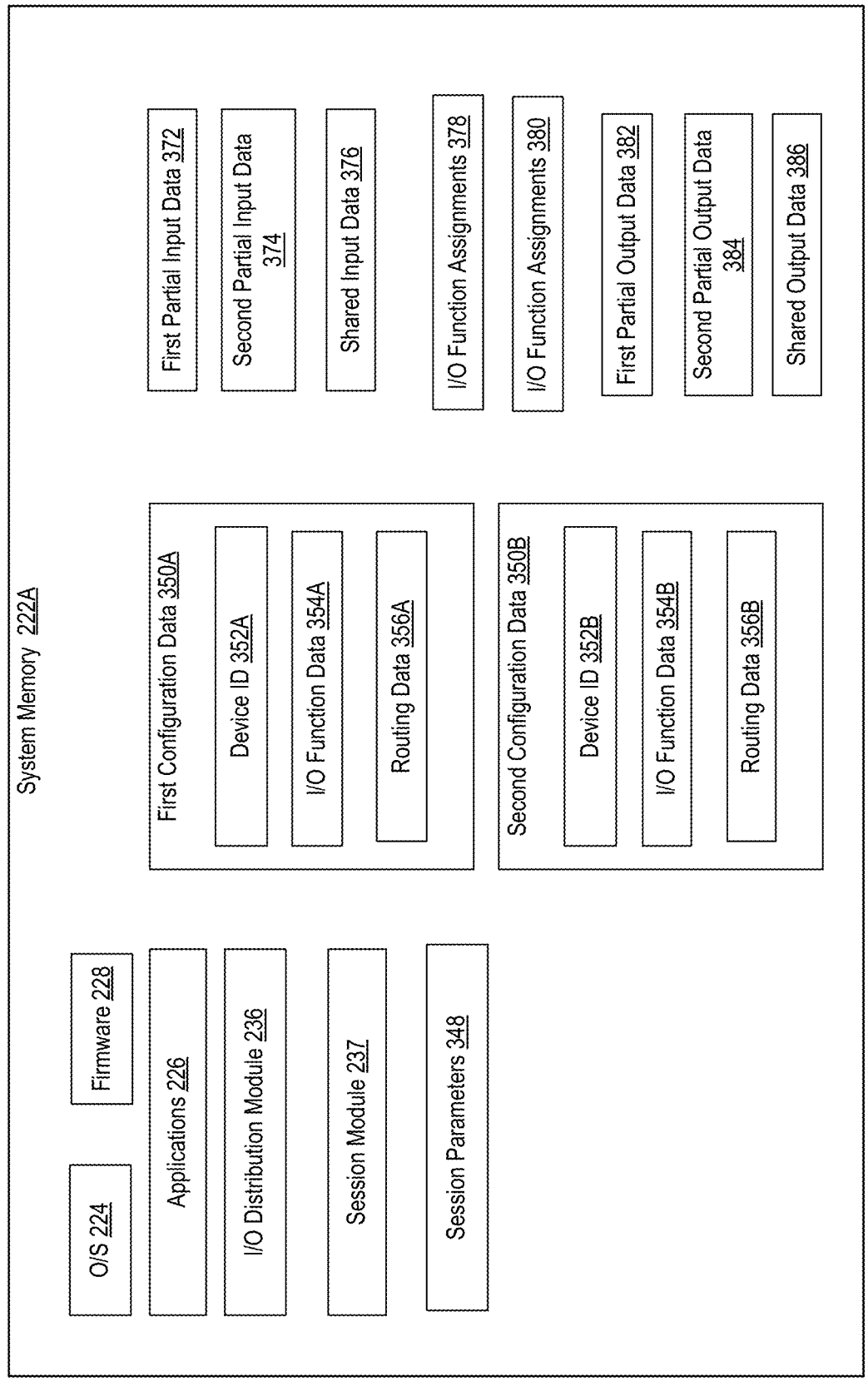
FIG. 3B is a block diagram of example contents of the system memory of a remote computing device, according to one or more embodiments.

Turning to FIG. 3B, one embodiment of example contents of example system memory 222A of example computing device 210A is shown. System memory 222A is representative of each of the plurality of system memories 222A-22D presented in FIG. 2. System memory 222A includes data, software, and/or firmware modules, including firmware 228, operating system 124, applications 226, I/O distribution module 236 and session module 237. In one embodiment, I/O distribution module 236 enables splitting I/O functions between several network-connected communication devices and remote computing system 190. In an embodiment, execution of I/O distribution module 236 by processor 220A configures computing device 210A to perform processes presented in the flowchart of FIG. 7, as will be described below. Session module 237 enables remote computing system 190 to create computing sessions with communication devices 100 or 170. System memory 222A further includes session parameters 348. Session parameters 348 represent information associated with computing sessions running on computing device 210A.

System memory 222A further includes first configuration data 350A and second configuration data 350B. First configuration data 350A includes device identifier (ID) 352A, I/O function data 354A and routing data 356A. First configuration data 350A is transmitted from a first communication device 100 or 170 to remote computing system 190. First configuration data 350A is received from first communication device 100 or 170 and stored to system memory 222A. Device ID 352A is the name or identity of first communication device 100 or 170. I/O function data 354A is information and data describing I/O functions and capabilities of one or more components of first communication device 100 or 170. Routing data 356A contains information for the transmission of data to first communication device 100 or 170 via communication network 150 or 160.

Second configuration data 350B includes device identifier (ID) 352B, I/O function data 354B, and routing data 356B. Second configuration data 350B is transmitted from second communication device 100 or 170 to remote computing system 190. Second configuration data 350B is received from second communication device 100 or 170 and stored to system memory 222A. Device ID 352B is the name or identity of second communication device 100 or 170. I/O function data 354B is information and data describing I/O functions and capabilities of one or more components of second communication device 100 or 170. Routing data 356B contains information for the transmission of data to a second communication device 100 or 170 via communication network 150 or 160.

System memory 222A further includes first partial input data 372, second partial input data 374 and shared input data 376. First partial input data 372 is input data received from first communication device 100 or 170. Second partial input data 374 is input data received from second communication device 100 or 170. Shared input data 376 is a combination of first partial input data 372 and second partial input data 374 that have been combined for use with one or more sessions 350.

System memory 222A further includes first I/O function assignments 378 and second I/O function assignments 380. First I/O function assignments 378 are I/O functions that are generated or assigned to a first communication device based on first I/O function data 354A received from the first communication device. Second I/O function assignments 380 are I/O functions that are generated or assigned to a second communication device based on second I/O function data 354B received from the second communication device. In one example embodiment, a display screen I/O function can be assigned to a first communication device for a session and another speaker I/O function can be assigned to a second communications device for the same session.

System memory 222A further includes first partial output data 382, second partial output data 384 and shared output data 386. Shared output data 386 is the total combined I/O function output data for a session that is to be transmitted to multiple communication devices. Shared output data 386 is split into first partial output data 382 for a first communication device, based on I/O function assignments 378, and into second partial output data 384 for a second communication device based on I/O function assignments 380.

Figure 4A:
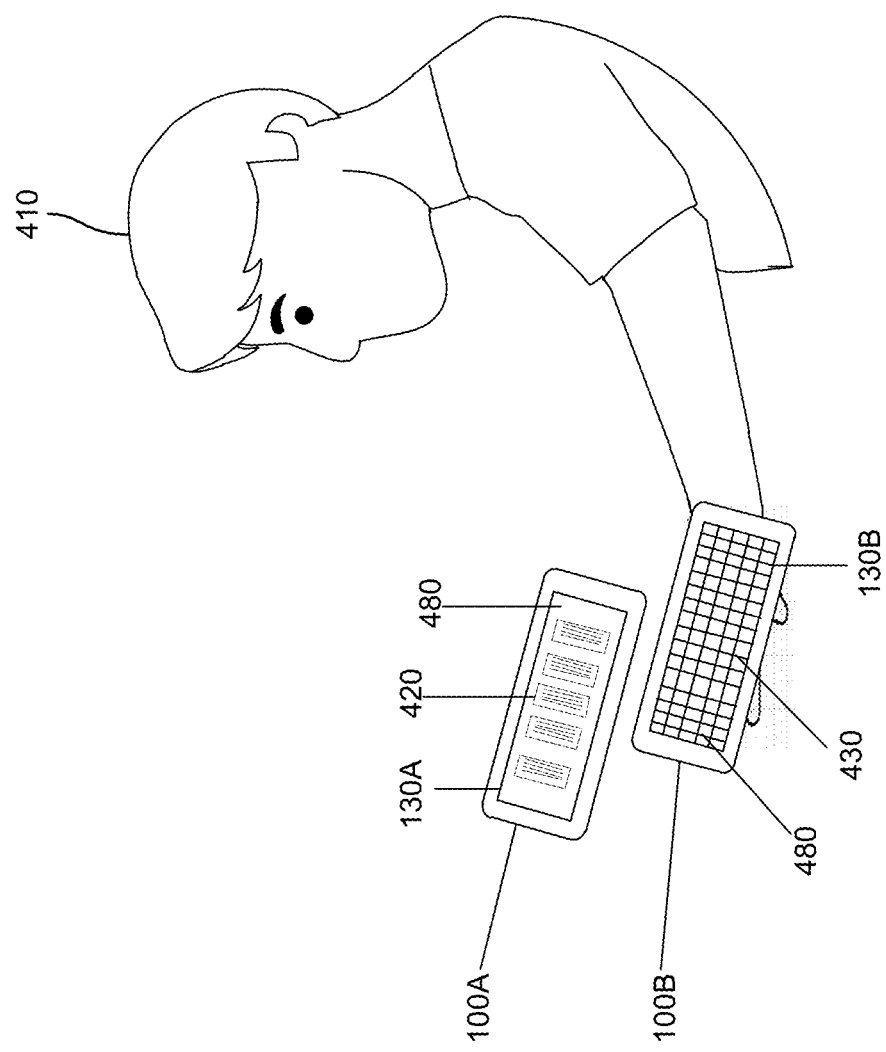
FIG. 4A is an example illustration of a user with one communication device configured as a display screen for viewing a document and another communication device configured as an on-screen keyboard for receiving typing input from the user, according to one or more embodiments.

FIG. 4A illustrates an example of user 410 using two communication devices 100A and 100B to split I/O functions for a session between the communication devices. Communication devices 100A and 100B are in communication with remote computing system 190 and are sharing session 480. Display 130A of communication device 100A is configured as a display screen for viewing a document 420 and display 130B of communication device 100B is configured as an on-screen keyboard 430 for receiving typing input from user 410. User 410 has configured communication device 100A to receive partial output data (i.e., video data) for session 480. User 410 has configured communication device 100B to receive partial input data (i.e., keyboard data) for session 480.

In one embodiment, user 410 can configure communication devices 100A and 100B to choose the I/O functions for each communication device by manually inputting I/O function data 335 to each of the communication devices. In another embodiment, remote computing system 190 can automatically query communication devices 100A and 100B to determine the I/O function capability or pre-determined I/O function settings for each of the communication devices. In one embodiment, remote computing system 190 can trigger communication devices 100A and 100B to transmit their respective I/O capabilities to remote computing system 190. Remote computing system 190 can then assign specific subsets of I/O functions to each respective communication device.

Figure 4B:
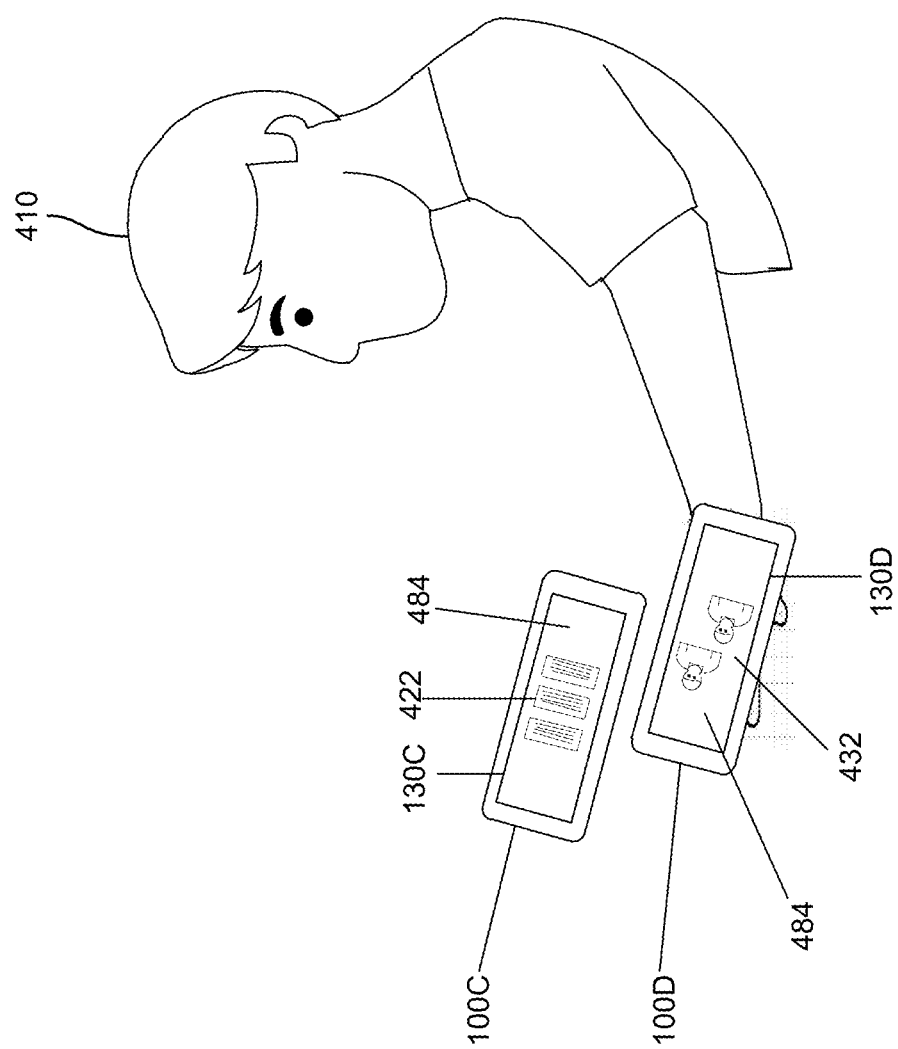
FIG. 4B is an example illustration of a user with one communication device configured as a display screen for viewing email and another communication device configured as an display screen for viewing a video, according to one or more embodiments.

FIG. 4B illustrates an example of user 410 using two communication devices 100C and 100D to split I/O functions for a session between the communication devices. Communication devices 100C and 100D are in communication with remote computing system 190 and are sharing 484. Display 130C of communication device 100C is configured as a display screen for viewing e-mails 422 and display 130D of communication device 100D is configured as display screen for viewing a video or movie 432. User 410 has configured communication device 100C to receive partial output data (e.g., video data for e-mail) for session 484. User 410 has configured communication device 100D to receive partial output data (e.g., video data for movie) for session 484.

Figure 4C:
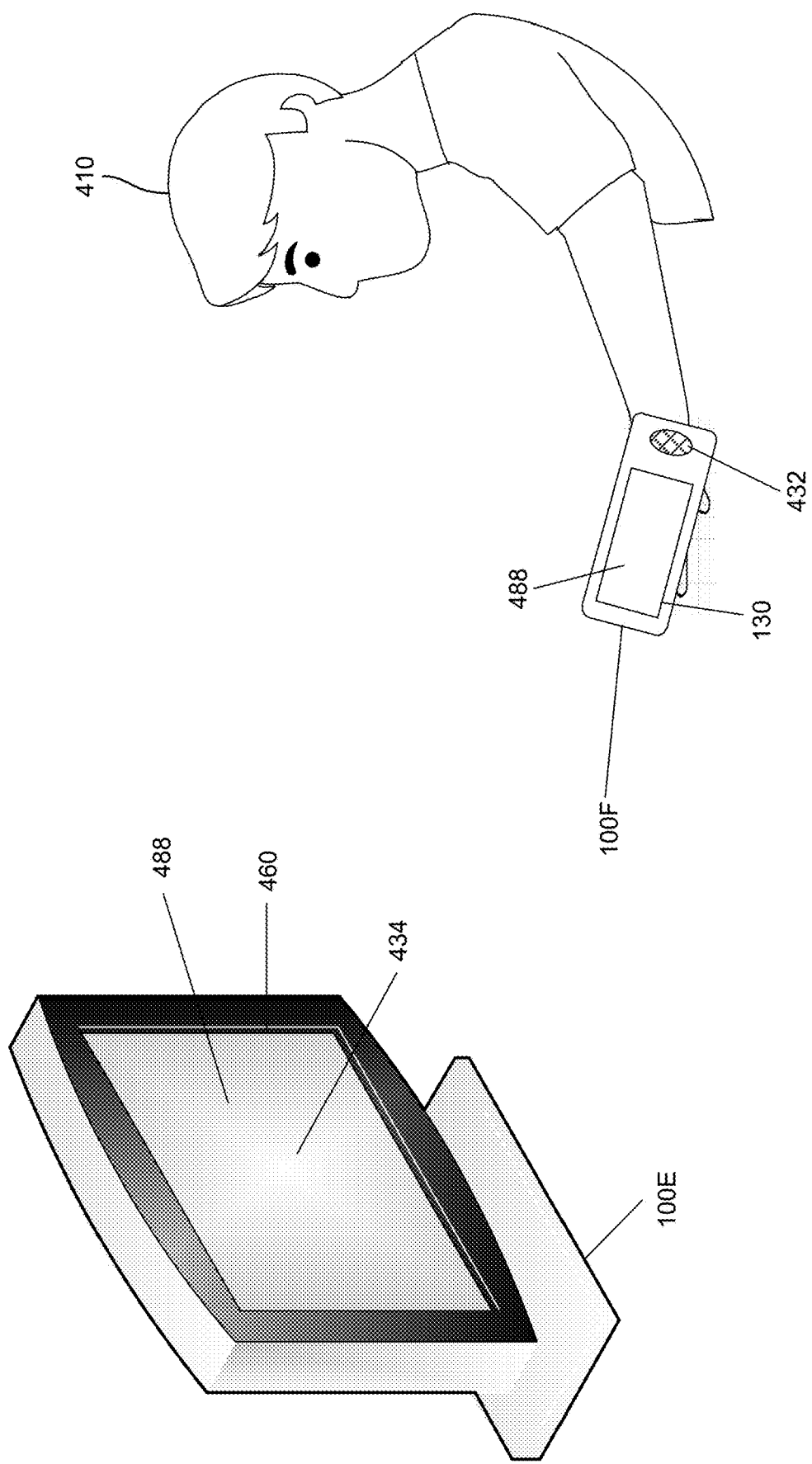
FIG. 4C is an example illustration of a user with one communication device configured as a display screen for viewing a video and another communication device configured as a nearby speaker, according to one or more embodiments.

FIG. 4C illustrates an example of user 410 using two communication devices 100E and 100F to split I/O functions for a session between the communication devices. Communication devices 100E and 100F are in communication with remote computing system 190 and are sharing session 488. Communication device 100E is a smart television that includes a display 460 that is showing a video 434. Communication device 100F is configured as a nearby speaker 144. User 410 has configured communication device 100E to receive partial output data (i.e., video data) for session 488. User 410 has configured communication device 100F to receive partial output data (i.e., audio data) for session 488.

In one embodiment, processor 220A receives a first request for a session from communication device 100A. Communication device 100A is remote from remote computing system 190 and in communication with the remote computing system via communication network 150. Processor 220A initiates session 221 for communication device 100A and receives a second request for shared access to session 221 from another communication device 100B. Communication device 100B is remote from remote computing system 190 and in communication with the remote computing system via communication network 150. Processor 220A initiates concurrent access to session 221 for communication device 100B and generates shared output data 380 for session 221. Processor 220A splits shared output data 380 into first partial output data 382 for communication device 100A and second partial output data 384 for communication device 100B. First partial output data 382 is associated with at least one input/output (I/O) function of communication device 100A and second partial output data 384 is associated with at least one I/O function of communication device 100B. Processor 220A transmits first partial output data 382 to communication device 100A and transmits second partial output data 384 to communication device 100B.

According to one aspect of the disclosure, multiple communication devices, such as communication devices 100 and 170 can connect to a single computing session of a remote computing system 190 and split I/O functions between the communication devices, based on a combination of user preferences and device capability. A user can authenticate or log-in to multiple communication devices to claim the devices for use and can configure the communication devices according to the preference of the user. Input data streams and output data streams can be shared and assigned to multiple communication devices.

In one embodiment, one communication device is a television that is configured to show all visual content and another communication device is a smartphone that is configured to provide a touchpad-like input, driving a cursor presented on the television. In another embodiment, one communication device is a television that is used to view a movie and two other communication devices are smart speakers that are configured to receive surround sound output streams.

In an additional embodiment, two communication devices are smartphones configured where the graphic output streams are split so that each smartphone shows half of the user interface (UI), while the touch input data streams would be merged in the remote computing system so that the combination of communication devices act as one communication device with a larger touchscreen. In still another embodiment, one communication device is a smartphone configured to show a document on a display and the other communication device is a smartphone configured as a touch sensitive on-screen keyboard for typing.

In one more embodiment, a user authenticates to two communication devices. One communication device is a smartphone configured to record a video and the other communication device is a smartphone placed closer to the action being recorded, to capture better audio. In yet another embodiment, two communication devices are each smart cameras that each generate partial input video and partial audio recording data streams that are sent to a session of a remote computing system that has a video mixing program. A third communication device such as a tablet computer is also connected to the session and is used to monitor and mix the partial video and audio data streams.

In an additional embodiment, a user configures two communication devices such as smartphones to be an input/output mirror. Each smartphone displays identical content, and touch inputs to each communication device are treated like separate fingers touching the same device. Smartphones configured as input/output mirrors could be used by two users for collaborative work. In one more embodiment, a user configures one communication device, such as a smartphone, to receive internet videos and configures another communication device, such as a smartphone, to receive and display email.

According to another aspect of the disclosure, a user can manually assign I/O functions to multiple communication devices that share a single session of a remote computing system. In one embodiment, a user can send a voice command, via a communication device, to the remote computing system to configure the I/O function of a communication device. For example, the user could state, "turn smartphone number one into a keyboard", and "show the home-screen on the family room smart television".

In another example, a communication device has an icon on a display screen for other devices and graphical elements representing input streams, output streams, or applications. The user can drag the graphical elements to the icon for the desired communication device in order to configure I/O functions of the communication device. The remote computing system can then route I/O data streams based on the user selections. In an additional example, a user can select one or more input streams, output streams, or applications and make a motion/tap/gesture while holding the communication device in their hand or in front of the device that would send or configure I/O function such that I/O data streams are routed to a selected communication device. The motion/tap/gesture can be repeated to configure and select multiple communication devices.

According to another aspect of the disclosure, a remote computing system can automatically assign I/O functions to multiple communication devices based on device capability data received from each communication device. Each communication device could provide information and data about capabilities for I/O functions, the quality of I/O peripherals, and the current device settings for I/O functions and/or peripherals. In one embodiment, a remote computing system can automatically assign video content data to the largest display screen available from among multiple communication devices, based on received device capability data. In another embodiment, a remote computing system determines which communication device a user is holding and automatically routes a text/cursor input stream from the communication device held by the user. In an additional embodiment, a remote computing system can automatically determine the communication device closest to the user and route audio data and video data input streams from the communication device that is closest to the remote computing system.

In one more embodiment, a remote computing system can automatically route a user authentication to the communication device having the most secure authentication capability. In still another embodiment, a remote computing system can automatically select the communication device with the lowest ambient noise level to receive audio data. In another embodiment, a remote computing system can automatically route audio output data to the communication device with the speakers having the highest fidelity.

In an embodiment, a remote computing system can automatically route step count input data from the communication device worn by the user. In another embodiment, a remote computing system can automatically reject or not use input data streams from communication devices that are currently in a pocket or bag as detected by an image capture device or proximity sensor. In an additional embodiment, a remote computing system can automatically reject input/output data streams from communication devices that do not support a specific type of input/output.

Figure 5:
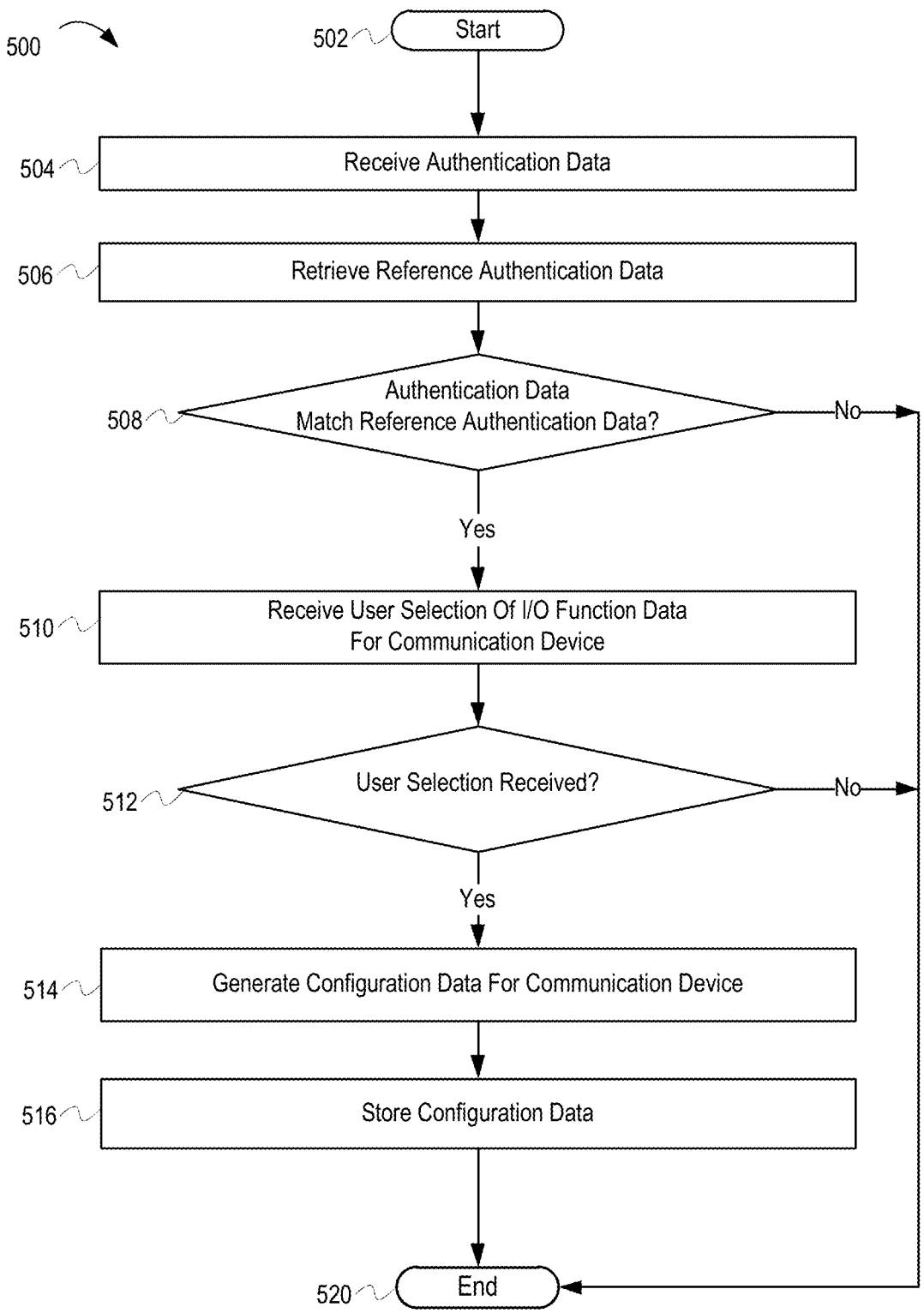
FIG. 5 depicts a flowchart of a method of configuring input/output functions of a communication device, according to one or more embodiments.
Figure 6:
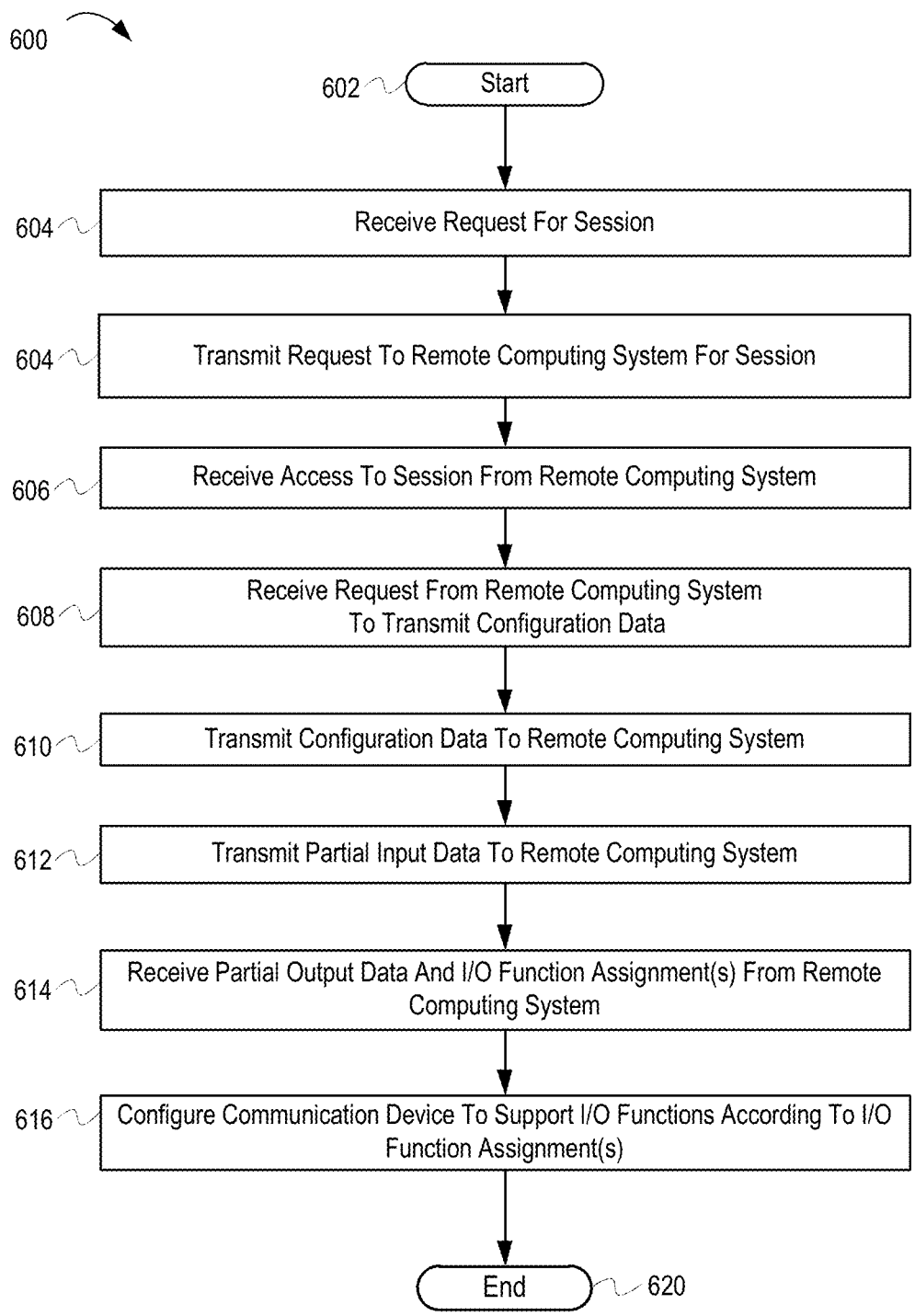
FIG. 6 depicts a flowchart of a method by which a communication device shares a session on a remote computing system, according to one or more embodiments.
Figure 7:
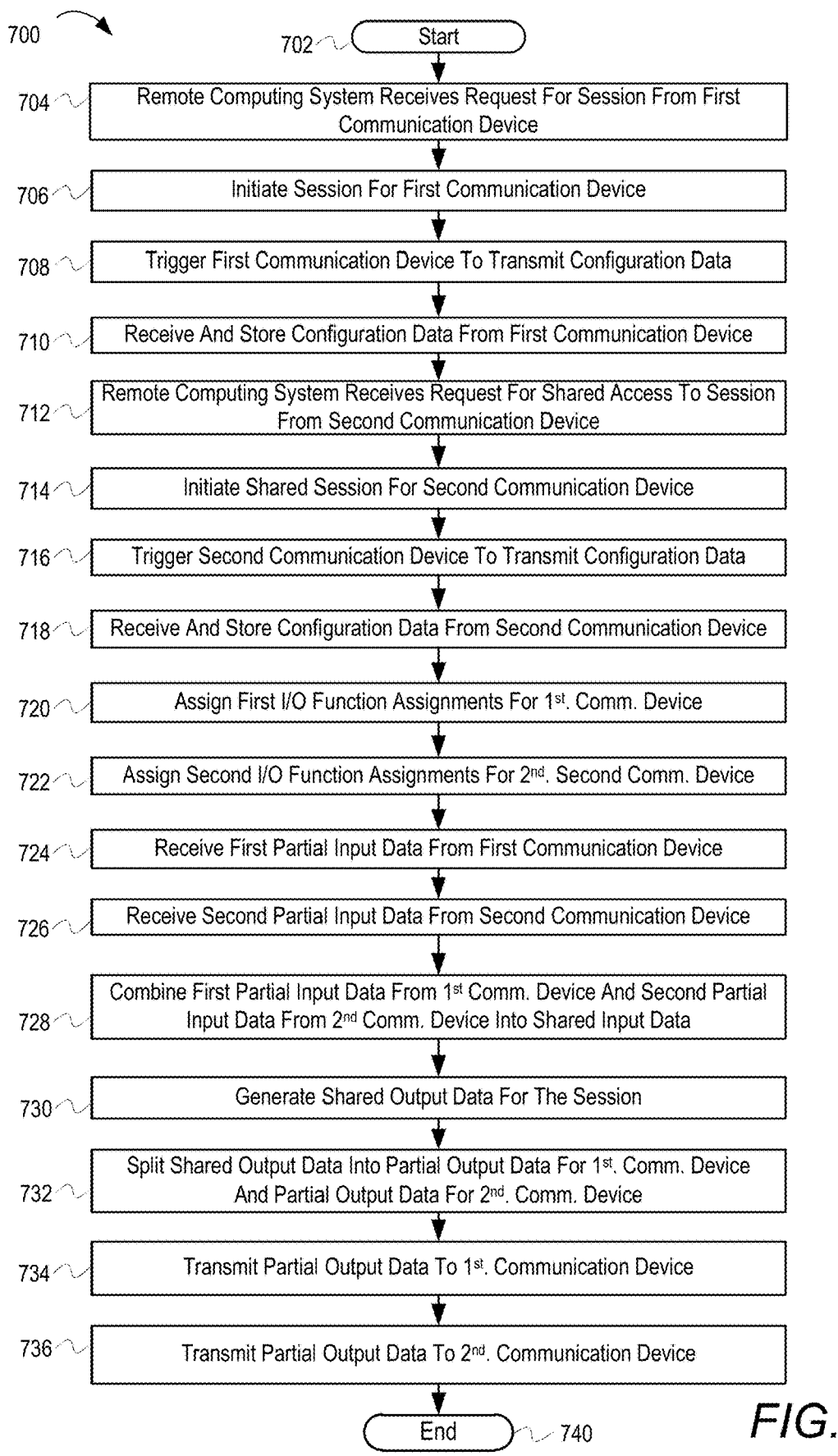
FIG. 7 depicts a flowchart of a method by which a remote computing system splits I/O functions between several network-connected communication devices, according to one or more embodiments.

Turning now to the flow charts, FIG. 5 depicts a method 500 for configuring input/output functions of a communication device. FIG. 6 depicts a method 600 by which a communication device shares a session on a remote computing system. FIG. 7 depicts a method 700 by which a remote computing system splits I/O functions between several network-connected communication devices. The description of methods 500-700 will be described with reference to the components and examples of FIGS. 1A-4C. The operations depicted in FIGS. 5 and 6 can be performed by communication device 100 or 170 or any suitable device, including one or more functional components of communication device 100 or 170 that provide the described features. The operations depicted in FIG. 7 can be performed by remote computing system 190. One or more of the processes of the methods described in FIGS. 5 and 6 may be performed by a processor (e.g., processor 102) executing program code associated with I/O distribution module 136. One or more of the processes of the methods described in FIG. 7 may be performed by a processor (e.g., processor 220A) executing program code associated with I/O distribution module 236.

FIG. 5 illustrates a method 500 for configuring input/output functions of a communication device, such as communication device 100 or 170. With specific reference to FIG. 5, method 500 begins at the start block 502. At block 504, processor 102 receives authentication data 310. Authentication data 310 can be received from one or more components (i.e., touch screen interface 131, image capture device 132 and microphone 108) of the communication device. Processor 102 retrieves reference authentication data 312 associated with at least one user of the communication device (block 506).

At decision block 508, processor 102 determines if authentication data 310 matches reference authentication data 312. In one embodiment, authentication data 310 can be an image captured by image capture device 132 and reference authentication data 312 can be the stored facial image of a user. In response to determining that authentication data 310 does not match reference authentication data 312, method 500 ends at end block 520.

In response to determining that authentication data 310 matches reference authentication data 312, processor 102 receives a user selection of I/O capability or function data 334 for one or more components (i.e., display 130, image capture device 132 and speaker 144) of the communication device (block 510). In one embodiment, processor 102 receives user selection or input of I/O function data 334 via touch screen interface 131 and/or microphone 108. For example, a user can select an icon on touch screen interface 131 to configure display 130 as an on-screen keyboard to receive typing input. Alternatively, a voice command can be received by microphone 108 to configure display 130 as an on-screen keyboard to receive typing input.

At decision block 512, processor 102 determines if a user selection of I/O function data 334 has been received. In response to a user selection of I/O function data 334 not being received. Method 500 terminates at end block 520. In response to a user selection of I/O function data 334 being received, processor 102 generates configuration data 330 for the communication device (block 514) and stores configuration data 330 to system memory 120 (block 516). Configuration data 330 includes the device identifier 332 of the specific communication device (i.e., communication device 100A, 100B, 100C, 100D, 100E, 100F), I/O function data 334 for the communication device, and routing data 336 for the communication device. Method 500 then ends at end block 520. I FIG. 6 illustrates a method 600 that enables communication device 100 or 170 to share a session on remote computing system 190. Method 600 begins at the start block 602. At block 604, processor 102 receives a request for a session 221 with remote computing system 190 from user 410. User 410 can manually select to initiate session 221 using an input device such as touch screen interface 131 or microphone 108. Processor 102 transmits a request to remote computing system 190 to initiate session 221. In one embodiment, transmitting the request to remote computing system 190 can include the transmission of authentication data 310 in order for remote computing system 190 to validate access to the session.

Processor 102 receives access to session 221 from remote computing system 190 (block 606). Processor 102 receives a request from remote computing system 190 to transmit configuration data 330 (block 608). Processor 102 transmits configuration data 330 to remote computing system 190 (block 610) and transmits partial input data 340 for the session to remote computing system 190 (block 612).

Processor 102 receives partial output data 342 for the session from remote computing system 190 (block 614). Processor 102 configures communication device 100 or 170 to support I/O functions for the session based on I/O function data 334 (block 616). Method 600 then terminates at end block 620.

FIG. 7 illustrates a method 700 for enabling remote computing system 190 to split I/O functions between several network-connected communication devices such as communication devices 100 or 170. Method 700 begins at the start block 702. At block 704, processor 220A receives a request to create session 221 from a communication device (i.e., communication device 100A). Processor 220A initiates session 221 for communication device 100A (block 706). Processor 220A triggers communication device 100A to transmit first configuration data 350A for communication device 100A (block 708). First configuration data 350A includes device ID 352A, I/O function data 354A and routing data 356A. Processor 220A receives configuration data 330A from communication device 100A and stores first configuration data 350A to system memory 222A (block 710).

At block 712, processor 220A receives a request for shared access to session 221 from another communication device (i.e., communication device 100B). In one embodiment, more than two communication devices may request shared access to the same session. For example, five communication devices can request shared access to the same session. Processor 220A initiates shared access to session 221 for communication device 100B (block 714). Processor 220A triggers communication device 100B to transmit configuration data 350B for communication device 100B (block 716). Second configuration data 350B includes device ID 352B, I/O function data 354B and routing data 356B. Processor 220A receives configuration data 330B from communication device 100B and stores second configuration data 350B to system memory 222A (block 718).

Processor 220A assigns I/O function assignments 378 for communication device 100A based on I/O function data 354A for communication device 100A (block 720). Processor 220A assigns I/O function assignments 380 for communication device 100B based on I/O function data 354B for communication device 100B (block 722). In one example embodiment, I/O function assignment 378 can designate display 130 of communication device 100A as a display device for a document and I/O function assignment 378 can designate display 130 of communication device 100B as an on-screen keyboard.

Processor 220A receives first partial input data 372 from communication device 100A (block 724) and second partial input data 374 from communication device 100B (block 726). Processor 220A combines first partial input data 372 and second partial input data 374 into shared input data 376 for session 221 (block 728). Processor 220A generates shared output data 386 for session 221 (block 730).

Processor 220A splits shared output data 386 into first partial output data 382 for communication device 100A based on I/O function assignments 378 and second partial output data 384 for communication device 100B based on I/O function assignments 380 (block 732). Processor 220A transmits first partial output data 382 to communication device 100A at least partially based on first routing data 356A (block 734) and transmits second partial output data 384 to communication device 100B at least partially based on second routing data 356B (block 736). Method 700 then terminates at end block 740.

In the above-described methods of FIGS. 5-7, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   receiving, via a processor of a computing system, a first request for a first session from a first communication device, the first communication device being remote from the computing system and in communication with the computing system via a communication network;
   initiating the first session for the first communication device;
   receiving, from a second communication device, a second request for shared access to the first session, the second communication device being remote from the computing system and in communication with the computing system via the communication network;
   initiating concurrent access to the first session for the second communication device;
   generating shared output data for the first session;
   splitting, based in part on received first input/output (I/O) function data of the first communication device and second I/O function data of the second communication device, the shared output data into first partial output data for the first communication device and second partial output data for the second communication device, the first partial output data associated with at least one first I/O function of the first communication device and the second partial output data associated with at least one second I/O function of the second communication device that is different from the at least one first I/O function, the first I/O function data comprising information and data describing I/O functions and capabilities of one or more components, quality of I/O peripherals, and current device settings for I/O functions and peripherals of the first communication device, the second I/O function data comprising information and data describing I/O functions and capabilities of one or more components, quality of I/O peripherals, and current device settings for I/O functions and peripherals of the second communication device;
   transmitting the first partial output data to the first communication device; and
   transmitting the second partial output data to the second communication device.

2. The method of claim 1, further comprising:
   receiving first partial input data from the first communication device, the first partial input data associated with at least one first input function;
   receiving second partial input data from the second communication device, the second partial input data associated with at least one second input function; and
   combining the first partial input data and the second partial input data to generate shared input data for the first session;
   the first partial input data and the second partial input data being different input data comprising a pairing of input data from among: (i) a video recording input and an audio input from one of the first device and the second device that is closer to an action being recorded; (ii) two partial input videos and two partial audio recording streams being sent to a video mixing program of the remote computer system; (iii) touch inputs on each device displaying identical content, each touch input on each device treated as a separate finger touching a same device; and separate input of internet videos and email.

3. The method of claim 1, further comprising:
   receiving first configuration data from the first communication device, the first configuration data comprising a first device identifier of the first communication device, first input/output (I/O) function data of the first communication device, and first routing information for the first output data;
   receiving second configuration data from the second communication device, the second configuration data comprising a second device identifier of the second communication device, second I/O function data of the second communication device, and second routing information for the second output data;
   storing the first configuration data and the second configuration data to the computing system; and assigning the at least one first I/O function based on the first configuration data and assigning the at least one second I/O function based on the second configuration data.

4. The method of claim 1, wherein splitting the shared output data further comprises:
assigning the at least one first I/O function based on received first configuration data from the first communication device; and
assigning the at least one second I/O function based on received second configuration data from the second communication device;
wherein the first partial output data and the second partial output data are different pairings of configuration data that respectively configures one of the first communication device and the second communication device to provide one pairing from among: (i) a display screen I/O function and a speaker I/O function; (ii) a display screen I/O function and an onscreen keyboard I/O function; (iii) a television I/O function presenting a television on a corresponding display device and a touchpad I/O function that drives a cursor presented on the television; (iv) a first half of user interface of a graphic output stream and a second half of the user interface; and (v) a first display screen I/O functions for viewing e-mails a second display screen I/O function for viewing a video or movie.

5. The method of claim 1, further comprising:
automatically triggering the first communication device and the second communication device to respectively transmit first configuration data from the first communication device and second configuration data from the second communication device to the computing system, the first and second configuration data comprising device capability data;
wherein splitting the shared output data into first partial output data for the first communication device and second partial output data is based on received device capability data and comprises at least one of:
automatically assigning video content data to a largest display screen available from among multiple communication devices, based on received device capability data;
determining which communication device a user is holding and automatically routing a text/cursor input stream from the communication device held by the user;
determining which communication device closest to the user and routing audio data and video data input streams from the communication device that is closest to user;
automatically routing a user authentication to the communication device having a most secure authentication capability;
automatically selecting the communication device with a lowest ambient noise level to receive audio data; and
automatically routing audio output data to the communication device with speakers having a highest fidelity.

6. A data processing system (DPS) comprising:
a memory having stored thereon an input/output (I/O) module for splitting I/O functions between a plurality of network-connected communication devices and the DPS, the plurality of network-connected communication devices being remote from the DPS and in communication with the DPS;
one or more processors communicatively coupled to the memory, the one or more processors executing program code of the I/O module, which enables the DPS to:
receive a first request for a first session from a first communication device;
initiate the first session for the first communication device;
receive a second request for shared access to the first session from a second communication device;
initiate concurrent access to the first session for the second communication device;
generate shared output data for the first session;
split the shared output data into first partial output data for the first communication device and second partial output data for the second communication device, the first partial output data associated with at least one first input/output (I/O) function of the first communication device and the second partial output data associated with at least one second I/O function of the second communication device;
split, based in part on received first input/output (I/O) function data of the first communication device and second I/O function data of the second communication device, the shared output data into first partial output data for the first communication device and second partial output data for the second communication device, the first partial output data associated with at least one first I/O function of the first communication device and the second partial output data associated with at least one second I/O function of the second communication device that is different from the at least one first I/O function, the first I/O function data comprising information and data describing I/O functions and capabilities of one or more components, quality of I/O peripherals, and current device settings for I/O functions and peripherals of the first communication device, the second I/O function data comprising information and data describing I/O functions and capabilities of one or more components, quality of I/O peripherals, and current device settings for I/O functions and peripherals of the second communication device;
transmit the first partial output data to the first communication device; and
transmit the second partial output data to the second communication device.

7. The DPS of claim 6, wherein the one or more processors are further enabled to:
receive first partial input data from the first communication device, the first partial input data associated with the at least one first I/O function;
receive second partial input data from the second communication device, the second partial output data associated with the at least one second I/O function; and
combine the first partial input data and the second partial input data to generate shared input data for the first session;
the first partial input data and the second partial input data being different input data comprising a pairing of input data from among: (i) a video recording input and an audio input from one of the first device and the second device that is closer to an action being recorded; (ii) two partial input videos and two partial audio recording streams being sent to a video mixing program of the remote computer system; (iii) touch inputs on each device displaying identical content, each touch input on each device treated as a separate finger touching a same device; and separate input of internet videos and email.

8. The DPS of claim 6, wherein the one or more processors are further enabled to:
receive first configuration data from the first communication device, the first configuration data comprising a first device identifier of the first communication device, first input/output (I/O) function data of the first communication device, and first routing information for the first output data;
receive second configuration data from the second communication device, the second configuration data comprising a second device identifier of the second communication device, second I/O function data of the second communication device, and second routing information for the second output data;
store the first configuration data and the second configuration data to the computing system; and
assign the at least one first I/O function based on the first configuration data and assigning the at least one second I/O function based on the second configuration data.

9. The DPS of claim 6, wherein the one or more processors are further enabled to:
assign the at least one first I/O function based on received first configuration data from the first communication device;
assign the at least one second I/O function based on received second configuration data from the second communication device;
wherein the first partial output data and the second partial output data are different pairings of configuration data that respectively configures one of the first communication device and the second communication device to provide one pairing from among: (i) a display screen I/O function and a speaker I/O function; (ii) a display screen I/O function and an onscreen keyboard I/O function; (iii) a television I/O function presenting a television on a corresponding display device and a touchpad I/O function that drives a cursor presented on the television; (iv) a first half of user interface of a graphic output stream and a second half of the user interface; and (v) a first display screen I/O functions for viewing e-mails a second display screen I/O function for viewing a video or movie.

10. The DPS of claim 6, wherein the one or more processors are further enabled to:
automatically trigger the first communication device and the second communication device to respectively transmit first configuration data from the first communication device and second configuration data from the second communication device to the computing system; and
wherein the one or more processors splits the shared output data into first partial output data for the first communication device and second partial output data based on received device capability data and in splitting the shared output data, the processor is enable to performing at least one of:
automatically assign video content data to a largest display screen available from among multiple communication devices, based on received device capability data;
determine which communication device a user is holding and automatically routing a text/cursor input stream from the communication device held by the user;
determine which communication device closest to the user and routing audio data and video data input streams from the communication device that is closest to user;
automatically route a user authentication to the communication device having a most secure authentication capability;
automatically select the communication device with a lowest ambient noise level to receive audio data; and
automatically route audio output data to the communication device with speakers having a highest fidelity.

11. A computer program product comprising:
a computer readable storage device with program code stored thereon which, when executed by one or more processors of a data processing system (DPS) enables the DPS to complete the functionality of:
receiving a first request for a first session from a first communication device, the first communication device being remote from the DPS and in communication with the DPS via a communication network;
initiating the first session for the first communication device;
receiving a second request for shared access to the first session from a second communication device, the second communication device being remote from the DPS and in communication with the DPS via the communication network;
initiating concurrent access to the first session for the second communication device;
generating shared output data for the first session;
splitting, based in part on received first input/output (I/O) function data of the first communication device and second I/O function data of the second communication device, the shared output data into first partial output data for the first communication device and second partial output data for the second communication device, the first partial output data associated with at least one first I/O function of the first communication device and the second partial output data associated with at least one second I/O function of the second communication device that is different from the at least one first I/O function, the first I/O function data comprising information and data describing I/O functions and capabilities of one or more components, quality of I/O peripherals, and current device settings for I/O functions and peripherals of the first communication device, the second I/O function data comprising information and data describing I/O functions and capabilities of one or more components, quality of I/O peripherals, and current device settings for I/O functions and peripherals of the second communication device;
transmitting the first partial output data to the first communication device; and
transmitting the second partial output data to the second communication device.

12. The computer program product of claim 11, wherein the program code for splitting I/O functions comprises program code that further enables the DPS to complete the functionality of:
receiving first partial input data from the first communication device, the first partial input data associated with the at least one first I/O function;
receiving second partial input data from the second communication device, the second partial output data associated with the at least one second I/O function; and combining the first partial input data and the second partial input data to generate shared input data for the first session;

the first partial input data and the second partial input data being different input data comprising a pairing of input data from among: (i) a video recording input and an audio input from one of the first device and the second device that is closer to an action being recorded; (ii) two partial input videos and two partial audio recording streams being sent to a video mixing program of the remote computer system; (iii) touch inputs on each device displaying identical content, each touch input on each device treated as a separate finger touching a same device; and separate input of internet videos and email.

13. The computer program product of claim 11, wherein the program code for splitting I/O functions comprises program code that further enables the DPS to complete the functionality of:

receiving first configuration data from the first communication device, the first configuration data comprising a first device identifier of the first communication device, first input/output (I/O) function data of the first communication device, and first routing information for the first output data;

receiving second configuration data from the second communication device, the second configuration data comprising a second device identifier of the second communication device, second I/O function data of the second communication device, and second routing information for the second output data;

storing the first configuration data and the second configuration data to the computing system; and assigning the at least one first I/O function based on the first configuration data and assigning the at least one second I/O function based on the second configuration data.

14. The computer program product of claim 11, wherein the program code for splitting I/O functions comprises program code that further enables the DPS to complete the functionality of:

assigning the at least one first I/O function based on received first configuration data from the first communication device; and assigning the at least one second I/O function based on received second configuration data from the second communication device;

wherein the first partial output data and the second partial output data are different pairings of configuration data that respectively configures one of the first communication device and the second communication device to provide one pairing from among: (i) a display screen I/O function and a speaker I/O function; (ii) a display screen I/O function and an onscreen keyboard I/O function; (iii) a television I/O function presenting a television on a corresponding display device and a touchpad I/O function that drives a cursor presented on the television; (iv) a first half of user interface of a graphic output stream and a second half of the user interface; and (v) a first display screen I/O functions for viewing e-mails a second display screen I/O function for viewing a video or movie.

15. The computer program product of claim 11, wherein the program code for splitting I/O functions comprises program code that further enables the DPS to complete the functionality of:

automatically triggering the first communication device and the second communication device to respectively transmit first configuration data from the first communication device and second configuration data from the second communication device to the computing system; and wherein splitting the shared output data into first partial output data for the first communication device and second partial output data is based on received device capability data and comprises at least one of:

automatically assigning video content data to a largest display screen available from among multiple communication devices, based on received device capability data;

determining which communication device a user is holding and automatically routing a text/cursor input stream from the communication device held by the user;

determining which communication device closest to the user and routing audio data and video data input streams from the communication device that is closest to user;

automatically routing a user authentication to the communication device having a most secure authentication capability;

automatically selecting the communication device with a lowest ambient noise level to receive audio data; and automatically routing audio output data to the communication device with speakers having a highest fidelity.

16. A method comprising:

transmitting, via a processor of a first communication device, a request for a first session to a computing system, the first communication device being remote from the computing system and in communication with the computing system via a communication network;

receiving access to the first session via the first communication device;

transmitting first I/O function data comprising information and data describing I/O functions and capabilities of one or more components, quality of I/O peripherals, and current device settings for I/O functions and peripherals of the first communication device;

transmitting first partial input data to the computing system, the first partial input data being a portion of shared input data for the computing system, the first partial input data associated with at least one first input/output (I/O) function of the first communication device; and receiving first partial output data from the computing system, the first partial output data being a portion of shared output data for the computing system, the first partial output data associated with the at least one first I/O function of the first communication device; and configuring the first communication device to support the at least one first I/O function.

17. The method of claim 16, further comprising:

transmitting a request for the first session for a second communication device to the computing system;

receiving access to the first session for the second communication device; and transmitting second I/O function data comprising information and data describing I/O functions and capabilities of one or more components, quality of I/O peripherals, and current device settings for I/O functions and peripherals of the second communication device;

transmitting second partial input data to the computing system, the second partial input data being a portion of the shared input data for the computing system, the second partial input data associated with at least one second I/O function of the second communication device; and receiving second partial output data from the computing system, the second partial output data being a portion of the shared output data for the computing system, the second partial output data associated with the at least one second I/O function of the second communication device; and configuring the second communication device to support the at least one second I/O function.

18. The method of claim 16, further comprising:

transmitting first configuration data to the computer system, the first configuration data comprising a first device identifier of the first communication device, the first I/O function data of the first communication device, and first routing information for the first output data.

19. The method of claim 16, further comprising:

receiving, via an input device, a selection of at least one I/O function configuration for the first communication device;

generating the first configuration data at least partially based on the selected at least one I/O function configuration; and transmitting the first configuration data to the computer system.

20. The method of claim 16, further comprising:

receiving a trigger from the computing system to automatically transmit first configuration data from the first communication device to the computing system; and transmitting the first configuration data to the computing system in response to receiving the trigger.

* * * * *